Patented June 29, 1954

2,682,546

UNITED STATES PATENT OFFICE 2,682,546

PREPARATION OF γ-ACETOPROPANOL

Harry B. Copelin, Niagara Falls, N. Y., assignor to E. I. du Pont de Nemours and Company, Wilmington, Del., a corporation of Delaware No Drawing. Application February 20, 1952,
Serial No. 272,691

9 Claims. (Cl. 260—347.8)

This invention relates to the preparation of acetopropanol by the hydrogenation-hydrolysis of 2-methylfuran in accordance with the following equation:

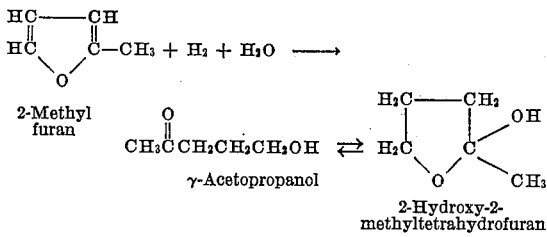

Throughout the specification, the term "acetopropanol" is used to designate γ-acetopropanol which may exist in an acyclic form and a cyclic form. Both forms are shown in the above equation, the cyclic form being designated as 2-hydroxy-2-methyltetrahydrofuran. It is probable that the product contains some of all possible forms in equilibrium and, in accordance with common practice, it is referred to herein for the sake of convenience simply as acetopropanol or γ-acetopropanol.

Acetopropanol has been previously obtained by the hydrogenation-hydrolysis of 2-methylfuran by subjecting the latter to the action of hydrogen in the presence of water and a hydrogenation catalyst. The combination reaction is generally regarded as being equivalent to the hydrogenation of 2-methylfuran to 4,5-dihydro-2-methylfuran, followed by hydrolysis of the latter. Both reactions appear to occur concurrently so that the reaction conditions employed must be favorable to both.

Scheipp et al. J. A. C. S. 69, 672 (1947), investigated the preparation of acetopropanol by the above method for the purpose of establishing optimum conditions. They reported the obtainment of acetopropanol in yields ranging from about 25–35% when hydrogenating 2-methylfuran in the presence of water and a small amount of formic acid. The present invention relates to an improved method whereby much higher yields of acetopropanol can be readily obtained.

It is an object of the present invention to provide an improved method for obtaining acetopropanol from 2-methylfuran. A particular object is to provide a method whereby 2-methylfuran may be converted to acetopropanol in good conversions. A still further object is to provide an improved hydrogenation-hydrolysis method for converting 2-methylfuran to acetopropanol. Still further objects will be apparent from the following description.

The above objects are accomplished in accordance with the invention by reacting 2-methylfuran dissolved in a lower saturated dialkyl ketone having from 3–5 carbon atoms, with hydrogen and water in the presence of a metallic palladium catalyst and of a small amount of a strong mineral acid employing a reaction mixture containing not more than 5 moles of water per mole of the 2-methylfuran being reacted.

It has been discovered that the lower saturated dialkyl ketones which have from 3–5 carbon atoms per molecule are excellent solvents for 2-methylfuran in the reaction mixture while carrying out the present reaction. Such ketones are acetone, methylethyl ketone, diethyl ketone, methylpropyl ketone and methylisopropyl ketone. Of these, acetone is distinctly preferred for cost and availability reasons and because of the generally excellent results obtained by its use. The solution of 2-methylfuran in the ketone should contain at least 0.5 part of the ketone per part by weight of 2-methylfuran. From 0.5 to about 3 parts will generally be employed although larger amounts of the ketone can be used if desired. The preferred amounts are from about 0.8 to 2 parts of the ketone per part by weight of 2-methylfuran. When amounts of the ketone outside of these preferred ranges are used, the conversion to the desired product decreases considerably.

Any metallic palladium hydrogenation catalyst can be used such as catalysts comprising metallic palladium supported on alumina, carbon, barium sulfate, silica gel or the like. Non-supported metallic palladium catalysts can also be used effectively. While using a supported catalyst, the catalyst will usually contain metallic palladium in amounts ranging from about 1–10% by weight, most usually about 5%. Assuming the supported catalyst contains about 5% palladium by weight, it will generally be employed in the reaction mixture in an amount corresponding to about 0.2–10% by weight of the reaction mixture. These amounts are merely illustrative and it will be the object in any specific instance to employ such amount of the catalyst as will be most beneficial in carrying out the reaction.

Since water is one of the reactants it should be present in a substantial amount in the reaction mixture. In general, there should be at least 1 mole of water per mole of 2-methylfuran to be reacted but the amount of water present should not exceed about 5 moles per mole of 2-methylfuran, since larger amounts decrease substantially the efficiency of the catalyst. Best results are obtained when employing from about 1.2 to about 3 moles of water per mole of 2-methylfuran being reacted.

The presence of a strong mineral acid in the reaction mixture is important and highly advantageous. However, excessive amounts of such an acid are disadvantageous, causing excessive formation of undesired by-products. The maximum amount permissible corresponds to about 0.2 mole of the acid per mole of 2-methylfuran being reacted and the preferred amounts are within the range of about 0.001–0.01 mole per mole of 2-methylfuran. Amounts of acid less than about 0.0001 mole per mole of 2-methylfuran are generally not effective in improving the conversion to acetopropanol. The strong mineral acid employed should of course not be deleteriously reactive with either 2-methylfuran or the acetopropanol product under the conditions of use. Illustrative of acids which can be used effectively are hydrochloric acid, hydrobromic acid and phosphoric acid. Of these, hydrochloric acid is definitely preferred for cost reasons and in view of the generally excellent results obtained.

One advantage of the present process employing a ketone solvent, a strong mineral acid and a metallic palladium catalyst, is that the desired reaction can be carried out with excellent conversion to acetopropanol at room or slightly elevated temperatures and at atmospheric or slightly elevated hydrogen pressures. Best results have been obtained at temperatures within the range of 15 to about 50° C. and at approximately atmospheric pressure, e. g., 0–40 p. s. i. g. Somewhat higher or lower temperatures, e. g., ranging from around 0 to 150° C., and higher pressures, e. g., up to 100 p. s. i. g. and higher, can be used although no particular advantages result therefrom and temperatures above about 50° are distinctly less preferred in that they cause increasing amounts of the 2-methyfuran to be converted to by-products.

Another distinct advantage of the present process, particularly when operated under the preferred conditions with respect to catalyst, temperature, pressure, and water content of the reaction medium, is that hydrogen absorption practically ceases when the theoretical amount has been absorbed. In contrast, the method of Scheipp et al. yields 1,4-pentanediol as the major product when hydrogenation is carried to completion. In other words, the present method favors specifically hydrogenation-hydrolysis to acetopropanol and does not require careful control to stop the reaction at the half-way point to prevent excessive conversion to some other product.

The reaction mixture should be effectively agitated during the course of the reaction. The use of a shaker or a rocker type reactor provides effective agitation; but, other well-known means for providing agitation, e. g., mechanical agitators, can be used if desired.

The invention is illustrated by the following examples:

*Example 1*

A Parr shaker type hydrogenator equipped with a 300 ml. citrate bottle was charged with 100 g. (1.22 moles) of 2-methylfuran, 100 g. of acetone, 35 ml. of 0.2 N hydrochloric acid and 2 g. of a palladium-on-carbon catalyst containing 5% by weight metallic palladium. The system was flushed once with nitrogen then three times with hydrogen, following which the hydrogenation-hydrolysis reaction was conducted at 25° C. and a hydrogen pressure of 15–42 p. s. i. g. until absorption of hydrogen ceased. This required about 7 hours. The catalyst was then filtered from the reaction mixture and the filtrate neutralized to a pH of 7 by stirring with sodium carbonate for 30 minutes. The acetone, water and low boiling by-products were distilled from the mixture at atmospheric pressure until the pot temperature exceeded 105° C. The residue was then fractionally distilled through a six-inch Vigreux column whereby 93 g. of acetopropanol, B. P. 78–80° C. (5–7 mm.) $n_D^{20}$ 1.4354, was obtained. This amount corresponded to a 75% conversion of the 2-methylfuran.

*Example 2*

Acetopropanol was prepared in the general manner described in Example 1 except that the citrate bottle in the hydrogenator was charged with 125 g. of acetone and 80 g. (0.98 mole) of 2-methylfuran. The conversion to acetopropanol was 65%. The use of a higher ratio of acetone to 2-methylfuran in this example than was used in Example 1 resulted in a lower conversion to acetopropanol.

*Example 3*

The general method of Example 1 was repeated except that 75 g. of acetone and 125 g. (1.52 moles) of 2-methylfuran were used. The conversion to acetopropanol in this case was 41% showing that as the ratio of solvent to 2-methylfuran is decreased substantially below the ratio used in Example 1, the conversion also decreases.

Acetopropanol can be employed as an intermediate in the preparation of many valuable organic compounds. In particular, it can be dehydratively distilled to produce 4,5-dihydro-2-methylfuran as disclosed in the application of Hause, Serial No. 272,699, filed February 20, 1952. The latter compound is readily converted to 2,3-dichlorotetrahydro-2-methylfuran by the addition chlorination method disclosed in the application of Hause, Serial No. 272,700, filed February 20, 1952. This dichlorotetrahydromethyfuran when reacted with thioformamide as disclosed in the application of Londergan and Schmitz, Serial No. 272,694, filed February 20, 1952, now Patent No. 2,654,760, yields 4-methyl-5-($\beta$-hydroxyethyl)-thiazole which is an important intermediate in the production of vitamin $B_1$.

I claim:

1. The method of preparing $\gamma$-acetopropanol comprising reacting at a temperature of 0–150° C. a solution of 2-methylfuran in a lower saturated dialkyl ketone having from 3–5 carbon atoms, which solution contains at least 0.5 part of said ketone per part by weight of said 2-methylfuran, with hydrogen and water in the presence of a metallic palladium catalyst and of a small amount of a strong mineral acid, the reaction mixture containing not more than 5 moles of water per mole of 2-methylfuran being reacted.

2. The method of claim 1 wherein the solution of 2-methylfuran contains 0.5–3.0 parts by weight of the ketone per part of 2-methylfuran and the reaction mixture contains 0.0001–0.2 mole of a strong mineral acid per mole of 2-methylfuran being reacted.

3. The method of claim 2 wherein the reaction is carried out at a temperature of 15–50° C. and the reaction mixture contains from 1–5 moles of water per mole of 2-methylfuran being reacted.

4. The method of claim 3 wherein the solution of 2-methylfuran contains 0.8–2 parts by weight of the ketone per part of 2-methylfuran and the reaction mixture contains from 0.001–0.1 mole of a strong mineral acid per mole of 2-methylfuran and from 1.2–3 moles of water per mole of 2-methylfuran.

5. The method of preparing γ-acetopropanol comprising reacting at a temperature of 0–150° C. a solution of 2-methylfuran in acetone, which solution contains from 0.5–3 parts by weight of acetone per part of 2-methylfuran, with hydrogen and water in the presence of a metallic palladium catalyst and of from 0.0001–0.2 mole of a strong mineral acid per mole of 2-methylfuran being reacted, the reaction mixture containing from 1–5 moles of water per mole of 2-methylfuran being reacted.

6. The method of claim 5 wherein the reaction is carried out at a temperature of 15–50° C. and from 0.001–0.01 mole of acid is employed per mole of 2-methylfuran being reacted.

7. The method of claim 5 wherein the strong mineral acid is hydrochloric acid.

8. The method of claim 5 wherein from 0.8–2 parts by weight of acetone are employed per part of 2-methylfuran and the reaction mixture contains from 1.2–3 moles of water per mole of 2-methylfuran.

9. The method of claim 8 wherein the strong mineral acid is hydrochloric acid.

References Cited in the file of this patent

UNITED STATES PATENTS

| Number | Name | Date |
|---|---|---|
| 2,444,301 | Kyrides et al. | June 29, 1948 |

OTHER REFERENCES

Scheipp et al., "Jour. Am. Chem. Soc.," vol. 69 (1947), pp. 672–74.

Wojcik, "Industrial and Eng. Chem.," vol. 40 (1948), pp. 210–16.

Wilson, "Jour. Am. Chem. Soc.," vol. 70 (1948), pp. 1313–15.